United States Patent [19]

Shaw et al.

[11] Patent Number: 5,678,244
[45] Date of Patent: Oct. 14, 1997

[54] METHOD FOR CAPTURE OF CHLORINE DISSOCIATED FROM A CHLORINE-CONTAINING COMPOUND

[75] Inventors: Cathy M. Shaw, North Easton; James E. Johnston, Waltham, both of Mass.

[73] Assignee: Molten Metal Technology, Inc., Waltham, Mass.

[21] Appl. No.: 388,941

[22] Filed: Feb. 14, 1995

[51] Int. Cl.$^6$ ..................................... A62D 3/00
[52] U.S. Cl. .................... 588/201; 588/206; 588/207
[58] Field of Search ....................... 588/201, 206, 588/207; 110/237; 423/DIG. 12

[56] References Cited

U.S. PATENT DOCUMENTS

| | | | |
|---|---|---|---|
| 4,009,023 | 2/1977 | Öberg et al. | 75/12 |
| 4,009,024 | 2/1977 | Miller | 75/30 |
| 4,102,690 | 7/1978 | Koper | 106/38.28 |
| 4,224,070 | 9/1980 | Youdelis | 75/257 |
| 4,401,623 | 8/1983 | Giacobbe et al. | 422/1 |
| 4,417,924 | 11/1983 | Schwer | 75/257 |
| 4,447,262 | 5/1984 | Gay et al. | 75/65 R |
| 4,574,714 | 3/1986 | Bach et al. | 110/346 |
| 4,602,574 | 7/1986 | Bach et al. | 110/346 |
| 5,028,257 | 7/1991 | Tomkins et al. | 75/305 |
| 5,191,154 | 3/1993 | Nagel | 588/201 |
| 5,240,492 | 8/1993 | Phillips et al. | 75/305 |
| 5,298,233 | 3/1994 | Nagel | 423/580.1 |
| 5,301,620 | 4/1994 | Nagel et al. | 110/346 |
| 5,374,309 | 12/1994 | Piniecki | 106/714 |
| 5,376,421 | 12/1994 | Sekhar et al. | 427/224 |
| 5,382,555 | 1/1995 | Stein et al. | 501/127 |
| 5,385,601 | 1/1995 | Kemeny et al. | 75/748 |
| 5,395,405 | 3/1995 | Nagel et al. | 48/197 R |
| 5,435,982 | 7/1995 | Wilkinson | 423/437 |

FOREIGN PATENT DOCUMENTS 38 30 259 A1   3/1990   Germany.

OTHER PUBLICATIONS

James E. Shelby and Christine E. Lord, "Formation and Properties of Calcia–Calcium Fluoride–Alumina Glasses," *J. Am. Ceram. Soc.*, 73(3):750–752 (1990).

Mineo Muraki, Hironori Fukushima and Nobuo Sano, "Phosphorus Distribution between CaO–CaF2–SiO2 Melts and Carbon–saturated Iron," *Transactions ISIJ.*, 25 (1985) Research Article 1025–1030.

J. E. Shelby, "Formation and Properties of Calcium Aluminosilicate Glasses," *J. Am. Ceram. Soc.*, 68(3):155–158 (1985).

James E. Shelby, Cathy M. Shaw and Marie S. Spess, "Calcium Fluoroaluminate Glasses," *J. Appl. Phys.*, 66(3):1149–1155 (Aug. 1, 1989).

Tomoo Takenouchi, Koreaki Suzuki and Sadao Hara, "Effect of Slag Composition on the Desulfurization and Dephosphorization of Molten Steel," *Transactions ISIJ*, 19:750–765 (1979).

G. J. W. Kor, "Effect of Fluorspar and Other Fluxes on Slag–Metal Equilibria Involving Phosphorus and Sulfur," *Metallurgical Transactions B*, 8B:107–113 (Mar. 1977).

Y. A. Minnev and V. T. Durtsev, "kinetics and Thermodynamics of the Pig Iron Simultaneous Dephosphorization and Desulphurization by CaO–CaCl$_2$–Al$_2$O$_3$ Slags," pp. 542–551.

A. McKague, A. McLean and I.D. Sommerville, "The Dephosphorization of Carbon Saturated Iron Using Lime–Calcium Halide Slags," *University of Toronto Process Technology Proceedings*, 6:493–497 (Washington, D.C.) (1986).

*Primary Examiner*—Ngoclan Mai
*Attorney, Agent, or Firm*—Hamilton, Brook, Smith & Reynolds, P.C.

[57] ABSTRACT

A method is disclosed for capture of chlorine dissociated from a chlorine-containing compound. A molten metal bath has a molten metal phase, which includes a metal or salt, and a fluid vitreous phase including calcium oxide, aluminum oxide, and sufficient silicon dioxide to cause the vitreous phase to remain fluid during exposure to chlorine dissociated from the chlorine-containing compound. The chlorine-containing compound is directed into the molten phase to cause the chlorine to dissociate from the compound, whereby the chlorine migrates to the fluid vitreous layer and interacts with the vitreous phase including calcium oxide to form an inorganic chlorinated compound, thereby capturing the chlorine from the chlorine-containing compound.

18 Claims, 6 Drawing Sheets

METHOD FOR CAPTURE OF CHLORINE DISSOCIATED FROM A CHLORINE-CONTAINING COMPOUND

BACKGROUND OF THE INVENTION

Many types of hazardous wastes are continuously being generated. These wastes often include organic materials that are chlorinated, such as pesticides, polychlorinated biphenyls (PCBs), paints and solvents. Also, other hazardous wastes include inorganic material, such as oxides of iron, zinc, aluminum, copper and magnesium and the salts of ferrous chloride ($FeCl_2$), ferric chloride ($FeCl_3$), aluminum chloride ($AlCl_3$), etc.

Current methods of hazardous waste disposal generally include dumping in designated landfills and incinerating. However, despite capping and other containment attempts, the integrity of dumps can be breached, thereby causing materials to leach into surrounding water tables. The other alternative of incineration typically results in only partial disposition of hazardous substances, thereby leaving residue, such as ash and emissions, which themselves are pollutants that are subject to environmental regulatory restrictions. Halogenated wastes are of particular concern because both dumping and incineration are especially susceptible to loss of water soluble and volatilizable contaminants, such as halogens leaching to the soil or escaping to the atmosphere. Therefore, disposal of hazardous wastes and, in particular, halogen-containing hazardous wastes, can cause release of harmful contaminants to the environment, thereby diminishing the quality of life in surrounding populations.

To minimize the environmental effects of waste disposal, alternative methods are being developed to convert wastes into benign, and preferably, useful substances. Among the most promising new methods are those described in U.S. Pat. Nos. 4,574,714 and 4,602,574, issued to Bach and Nagel. These methods dissociate materials, such as organic materials, to their atomic constituents in a molten metal bath and reform the atomic constituents into environmentally acceptable products, including hydrogen, carbon monoxide and/or carbon dioxide gases.

SUMMARY OF THE INVENTION

The present invention relates to a method for capture of chlorine dissociated from a chlorine-containing compound.

The method includes providing a molten bath having a molten metal phase and a fluid vitreous phase. The fluid vitreous phase includes calcium oxide, aluminum oxide, and sufficient silicon dioxide to cause the vitreous phase to remain fluid during exposure to chlorine dissociated from the chlorine-containing compound. The chlorine-containing compound is directed into the molten phase to cause the chlorine to dissociate from said compound, whereby the chlorine migrates to the fluid vitreous layer and interacts with the vitreous phase to form an inorganic chlorinated compound, thereby capturing the chlorine from the chlorine-containing compound.

This invention provides several advantages. For example, one advantage is that the dissociated chlorine can be captured and retained in the vitreous phase while retaining the fluidity of the vitreous phase. Retaining a fluid vitreous phase layer prevents loss of chlorine from the molten metal bath directly to the gas phase. By capturing the chlorine in the fluid vitreous phase, the chlorine can be removed from the vitreous phase in a concentrated form and subsequently disposed of in a suitable manner. Another advantage is that the processing and recycling of halogens from halogenated materials can be achieved in greater yields by employing the method of the invention.

DETAILED DESCRIPTION OF THE INVENTION

The features and other details of the method and apparatus of the invention will now be more particularly described with reference to the accompanying drawings and pointed out in the claims. It will be understood that the particular embodiments of the invention are shown by way of illustration and not as limitations of the invention. The principal features of this invention can be employed in various embodiments without departing from the scope of the invention. All parts and percentages are by weight unless otherwise specified.

The present invention relates generally to a method for capture of chlorine dissociated from a chlorine-containing compound. A process and apparatus for dissociating waste in molten metal baths are disclosed in U.S. Pat. Nos. 4,574,714 and 4,602,574, issued to Bach et al. The method and apparatus can destroy polychlorinated biphenyls and other organic wastes, optionally together with inorganic wastes. The teachings of U.S. Pat. Nos. 4,574,714 and 4,602,574 are hereby incorporated by reference. Another apparatus and method for dissociating waste in a molten metal bath and for forming gaseous, vitreous and molten metal product streams from the waste are disclosed in U.S. Pat. No. 5,301,620, issued to Nagel et al. The teachings of which are hereby incorporated by reference.

Figure 1:
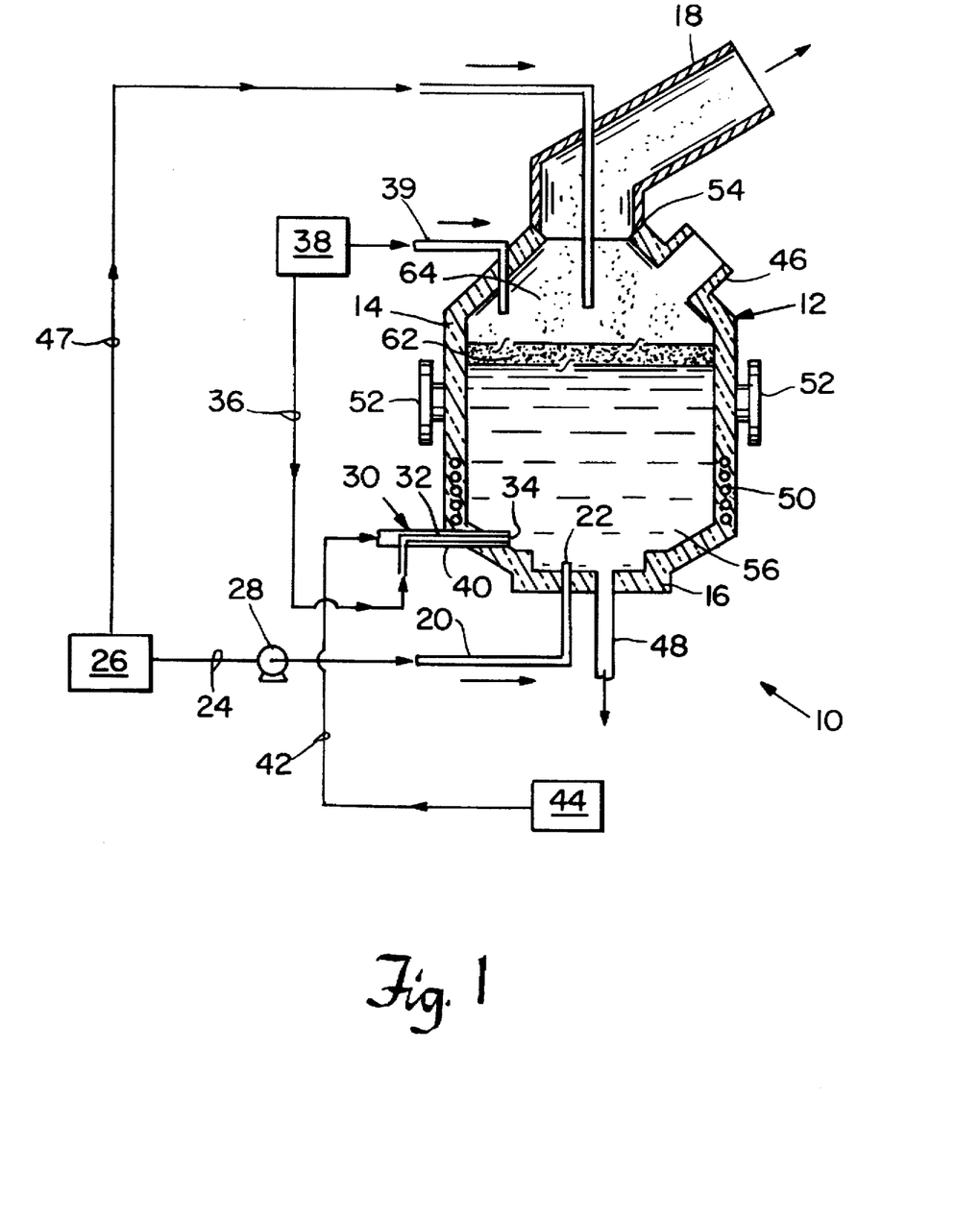
FIG. 1 is a schematic representation of a system suitable for employing the method of the invention for capture of chlorine dissociated from a chlorine-containing compound.

An example of a suitable system for carrying out the method of the invention is shown in FIG. 1. Therein, system 10 includes reactor 12. Examples of suitable reactors include appropriately modified steelmaking vessels known in the art as K-BOP, Q-BOP, argon-oxygen decarbonization furnaces (AOD), BOF, etc. Reactor 12 includes upper portion 14 and lower portion 16. Off-gas outlet 18 extends from upper portion 14 and is suitable for conducting an off-gas composition out of reactor 12.

Waste material inlet tube 20 includes waste material inlet 22 and extends from lower portion 16 of reactor 12. Line 24 extends between waste material source 26 and waste material inlet tube 20. Pump 28 is disposed in line 24 for directing waste material from waste material source 26 through waste material inlet tube 20 and into the molten bath contained in reactor 12.

Tuyere 30 is disposed at lower portion 16 of reactor 12. Tuyere 30 includes oxidizing agent tube 32 for injection of a separate oxidizing agent at oxidizing agent inlet 34. Line 36 extends between oxidizing agent tube 32 and oxidizing agent source 38. Outer tube 40 of tuyere 30 is disposed concentrically about oxidizing agent tube 32 at oxidizing agent inlet 34. Line 42 extends between outer tube 40 and shroud gas source 44 for conducting a suitable shroud gas from shroud gas source 44 through the concentric opening between outer tube 40 and oxidizing agent tube 32 to oxidizing agent inlet 34.

It is to be understood, however, that more than one waste material tube or more than one oxidizing agent tube, or combinations thereof, can be disposed at the lower portion of reactor 12 for introduction of waste material and an oxidizing agent into reactor 12. Suitable waste material can also, optionally, be introduced into reactor 12 through port 46 and/or conducted from waste material source 26 through line 47 to reactor 12. Other means, such as an injection lance (not shown) can also be employed to introduce waste material into the molten bath in reactor 12.

Bottom tapping spout 48 extends from lower portion 16 of reactor 12 and is suitable for removal of molten bath from reactor 12.

Induction coil 50 is disposed at lower portion 16 for heating molten bath 56 in reactor 12. It is to be understood that, alternatively, reactor 12 can be heated by other suitable means, such as by oxyfuel burners, electric arcs, etc.

Trunions 52 are disposed at reactor 12 for manipulation of reactor 12. Seal 54 is disposed between off-gas outlet 18 and port 46 and is suitable for allowing partial rotation of reactor 12 about trunions 52 without breaking seal 54.

Molten bath 56 is formed by at least partially filling reactor 12 with a suitable metal. Molten bath 56 can include metals or salts or combinations thereof. In one embodiment, the molten bath can be formed substantially of elemental metal. Examples of suitable metals include iron, copper, nickel, zinc, etc. Also, molten bath 56 can comprise a metal having a free energy of oxidation, at operating conditions of system 10, which is greater than the free energy for conversion of atomic carbon to carbon monoxide. Examples of suitable metals include iron, chromium, nickel and manganese. Molten bath 56 can also include more than one metal. For example, molten bath 56 can include a solution of miscible metals, such as iron and nickel, or a mixture of immiscible metals, such as iron and copper. Alternatively, molten bath 56 can be formed substantially of metal salts. Examples of suitable salts include sodium chloride, potassium chloride, etc. Molten bath 56 is then heated to a suitable temperature by activation of means for heating.

In many cases when a metal is included, it is also preferred to have the viscosity of molten bath 56 in reactor 12 less than about ten centipoise at the operating conditions of reactor 12.

The metal is then heated to a suitable temperature by activation of induction coil 52 or by other suitable means, not shown. Suitable operating conditions of system 10 include a temperature such that it is sufficient to maintain a molten bath and have a catalytic nature that can provide activation for converting at least partially the chlorinated waste by dissociation to elemental chlorine and other elemental constituents. Generally, for an iron bath, a temperature in the range of between about 1,300° and 1,700° C. is suitable.

Molten bath 56 has vitreous layer 62, which can also be called a ceramic layer or slag layer. Vitreous layer 62, which is disposed on molten bath 56, is substantially immiscible with molten bath 56. Vitreous layer 62 can have a lower thermal conductivity than that of molten bath 56. Radiant heat loss from molten bath 56 can thereby be reduced to significantly below the radiant heat loss from molten bath where no vitreous layer is present.

The vitreous layer is composed primarily of a chlorine-absorbing composition having calcium oxide (CaO), aluminum oxide ($Al_2O_3$) and silicon dioxide ($SiO_2$). The calcium oxide can include or be substituted by other calcium oxide-like compounds that behave similarly, such as magnesium oxide (MgO), strontium oxide (SrO), sodium oxide ($Na_2O$), potassium oxide ($K_2O$) and lithium oxide ($Li_2O$). These compounds are herein referred to as calcium oxide compositions. The vitreous layer contains a suitable composition for scrubbing chlorine while substantially preventing the formation of hydrogen chloride. The concentrations of the calcium oxide, aluminum oxide, and sufficient silicon dioxide cause the vitreous phase to remain fluid during exposure to chlorine dissociated from a chlorine-containing compound while directing the chlorine-containing compound into the molten metal bath. The molten metal bath causes the chlorine to dissociate from the compound, whereby the chlorine migrates to the fluid vitreous layer and interacts with the vitreous layer including the calcium oxide to form an inorganic chlorinated compound or complex, thereby capturing the chlorine from the chlorine-containing compound. Preferably, the molar ratio of silicon dioxide to aluminum oxide should be greater than about one, in order to maintain fluidity of the vitreous layer in the presence of chlorine. Traditionally, aluminum oxide and silicon dioxide are added to alter the liquidus of the melt and add structure to the vitreous layer and are commonly referred to as a network intermediate and network former, respectively.

A wide variety of waste material is suitable for treatment by this invention. An example of a suitable waste material is a chlorinated hydrogen-containing carbonaceous material, such as oil or a waste, which includes organic waste compounds containing chlorine. For example, the chlorinated waste includes a chlorinated alkane or a chlorinated aromatic, such as a polychlorinated biphenyl or a dioxin. It is to be understood that the waste material can include chlorinated inorganic waste compounds.

Waste material is directed from waste material source 26 through line 24 by pump 28 and is injected into molten bath 56 through waste material tube 20. In one embodiment, the waste material is a fluid which can include waste material components dissolved or suspended within a liquid. In another, solid particles of waste material components are suspended in an inert gas, such as argon.

Waste material directed into molten bath 56 is converted to chlorine, carbon, hydrogen and its other atomic constituents. A suitable oxidizing agent is directed from oxidizing agent source 38 through line 36 and is injected through oxidizing agent tube 32 into molten bath 56. In one embodiment, the oxidizing agent is directed into molten bath 56 when the carbon, which is dissolved in the molten metal, approaches saturation in the molten metal. Examples of suitable oxidizing agents include oxygen, air, iron oxide, etc., with the preferred oxidizing agent being oxygen gas.

Molten bath 56 has a temperature sufficient to cause the organic waste material injected into molten bath 56 to be converted to chlorine, carbon, hydrogen and other atomic constituents and to cause chlorine in molten bath 56 to form chlorine gas or a chloride. Oxidizing agent, which oxidizes carbon contained in the molten metal, is directed into molten bath separately or concurrently to form a carbon oxide gas.

Figure 2:
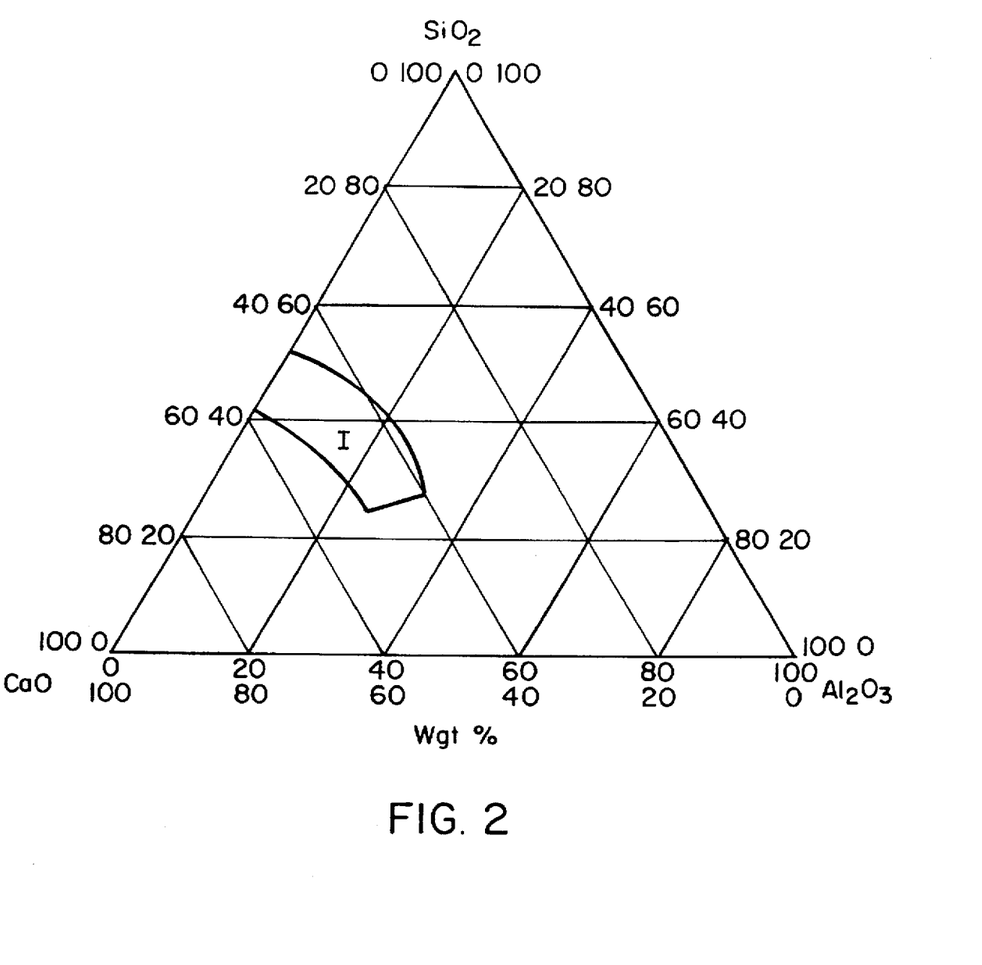
FIG. 2 is a ternary diagram of a calcium oxide, silicon dioxide and aluminum oxide system, by weight percent, of a region identified for chlorine-capture for the ternary system at 1,600° C.

An example of a suitable vitreous composition of calcium oxide, aluminum oxide and silicon dioxide is indicated in FIG. 2 by Region I while operating a molten bath at about 1,600° C. Region I, which has a concentration of calcium oxide in the range of between about 35 and 70 percent, by weight, of silicon dioxide in the range of between about 25 and 50 percent, and of aluminum oxide up to about 40 percent, is sufficient to cause the vitreous phase to remain fluid during exposure to chlorine dissociated from the chlorine-containing compound. The dissociated chlorine interacts with the vitreous layer including calcium oxide to form an inorganic chlorinated compound or complex. The inorganic chlorinated compound can be calcium chloride. Also, the compound can be a chloride and oxide complex of calcium, aluminum and silicon. In one embodiment, the vitreous phase has a composition of calcium oxide, aluminum oxide and silicon dioxide that is in Region I as shown in FIG. 2. Compositions outside Region I that are a liquid at 1,600° C. display poor chlorine capture in the vitreous phase by allowing the chlorine to migrate to the gas phase as a chlorinated species or have a substantial increase in melt viscosity followed by solidification as a result of chlorine addition.

The invention will now be further explained by the following examples of various applications of the method of the invention for capture of chlorine dissociated from a chlorine-containing compound.

EXAMPLE 1

The Table, which is shown below, discloses the description of compositions melted in CaO—CaCl$_2$—Al$_2$O$_3$—SiO$_2$ systems. From CaO—Al$_2$O$_3$—SiO$_2$ systems, selected samples were chosen for chlorine additions and were melted at 1,600° C. to form fluid melts. Chloride additions in the form of calcium chloride to these compositions resulted in two distinct behaviors: 1) calcium chloride additions resulted in fluidizing the melt in the low alumina region, such as Region I of the ternary diagram in FIG. 2; and 2) calcium chloride additions resulted in a sharp decrease in the fluidity of the melt in the high alumina region. Calcium chloride was used to simulate the formation of a calcium compound from calcium oxide which occurs while in the presence of chlorine, such as a chloride and oxide complex of calcium, aluminum and silicon. The transition region for this behavior is indicated in the observations, and shown schematically on the ternary plot in FIG. 2 along the border of Region I where the molar ratio of aluminum oxide to silicon oxide is about one or greater.

This change in behavior with chloride additions was unexpected based on fluoride additions in the same CaO—Al$_2$O$_3$—SiO$_2$ system. X-ray diffraction analysis of samples which exhibited a large increase in viscosity with chloride additions and resulting in an inoperable material, are given below. Samples that were not chlorinated formed fluid melts with the resulting quenched sample being a glass. Note that chloride addition to a Region I composition, 40%CaO-15%CaCl$_2$-5%Al$_2$O$_3$-40%SiO$_2$, by mole percent, did not result in the formation of a crystalline phase. X-ray diffraction of some chlorinated samples outside Region I showed the presence of a precipitated crystalline phase which is believed to be responsible for the rapid increase in viscosity of the vitreous layer. In some cases, these samples did not appear to flow at all at the melt temperature of 1,500°–1,600° C.

TABLE

X-Ray Diffraction Analysis of Chlorinated Samples

| Composition (mol %) CaO/CaCl$_2$—Al$_2$O$_3$—SiO$_2$ | Primary Crystalline Phase | Minor Crystalline Phase | Residual Glassy Phase |
|---|---|---|---|
| 40/15-5-40 (Q) | none | none | all glass |
| 60/0-20-20 (Q) | none | none | all glass |
| 50/10-20-20 (Q) | yes | none | yes |
| 60/0-30-10 (Q) | none | none | all glass |
| 55/5-30-10 (Q) | yes | none | yes |

Q: as-quenched sample

EXAMPLE 2

Figure 3:
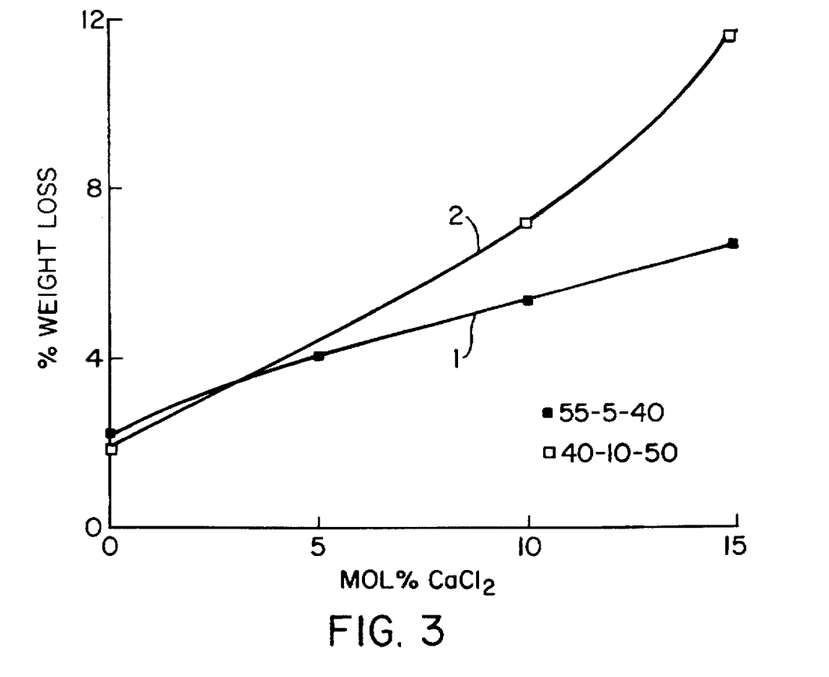
FIG. 3 is a plot of the percent weight loss upon heating of 55%CaO-5%$Al_2O_3$-40%$SiO_2$ and 40%CaO-10%$Al_2O_3$-50%$SiO_2$ systems, by mole percent, as a function of the calcium chloride content substituted for calcium oxide.
Figure 4:
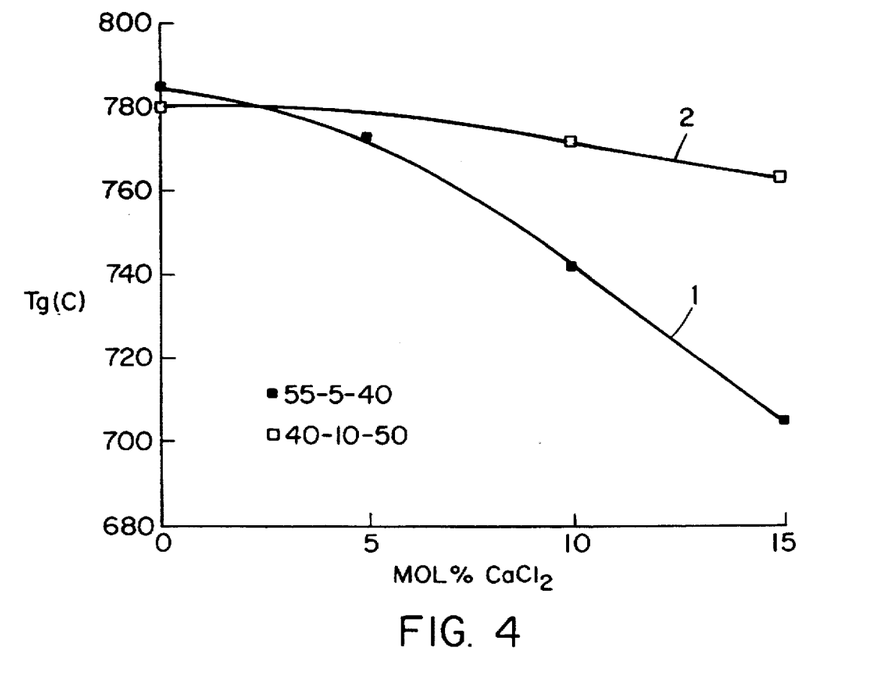
FIG. 4 is a plot of the glass transition temperature as a function of the calcium chloride content, by mole percent, substituted for calcium oxide in 55%CaO-5%$Al_2O_3$-40%$SiO_2$ and 5%CaO-10%$Al_2O_3$-50%$SiO_2$ systems.

Two sets of compositions were prepared. The first set had mole percentages of 55%CaO-5%Al$_2$O$_3$-40%SiO$_2$, 50%CaO-5%CaCl$_2$-5%Al$_2$O$_3$-40%SiO$_2$, 45%CaO-10%CaCl$_2$-5%Al$_2$O$_3$-40%SiO$_2$, and 40%CaO-15%CaCl$_2$-5%Al$_2$O$_3$-40%SiO$_2$. The second set had mole percentages of 40%CaO-10%Al$_2$O$_3$-50%SiO$_2$, 35%CaO-5%CaCl$_2$-10%Al$_2$O$_3$-50%SiO$_2$ and 25%CaO-15%CaCl$_2$-10%Al$_2$O$_3$-50%SiO$_2$. Each was weighed prior to melting. The compositions (of known weight) were melted at 1,600° C. for 15 minutes, removed from the furnace and cooled to room temperature. The compositions were then reweighed and the percent change in weight was calculated. A plot of weight loss percent for the 55-0-5-40, 50-5-5-40, 45-10-5-40 and 40-15-5-40 CaO—CaCl$_2$—Al$_2$O$_3$—SiO$_2$ compositions versus mole percent CaCl$_2$ is represented by line 1, as shown in FIG. 3. Similarly, a plot of weight loss percent for 40-0-10-50, 35-5-10-50, 30-10-10-50 and 25-15-10-50. CaO—CaCl$_2$—Al$_2$O$_3$—SiO$_2$ compositions are represented by line 2. The increased weight loss of the 40-0-10-50 series of melts, line 2, indicated that the chlorine or chlorinated species were less stable in the melts than for the 55-0-5-40 series of melts, line 1, thereby indicating that the 55-0-5-40 series retained more chlorine in the melt.

The glass transition temperature of each melt was measured by Differential Thermal Analysis, using the intercept method, and plotted versus mole percent of calcium chloride, as shown in FIG. 3. The glass transition temperature ($T_g$) was an indicator of the chlorine content of the solidified vitreous phase. A decrease in the glass transition temperature indicated an increase in the chlorine content of the vitreous phase. The melts for the 55-0-5-40 series are represented by line 1, and the melts for the 40-0-10-50 series of melts are represented by line 2. The data indicated that the 55-0-5-40 incorporated significant amount of chlorine into the structure while the 40-0-10-50 series does not.

EXAMPLE 3

Figure 5:
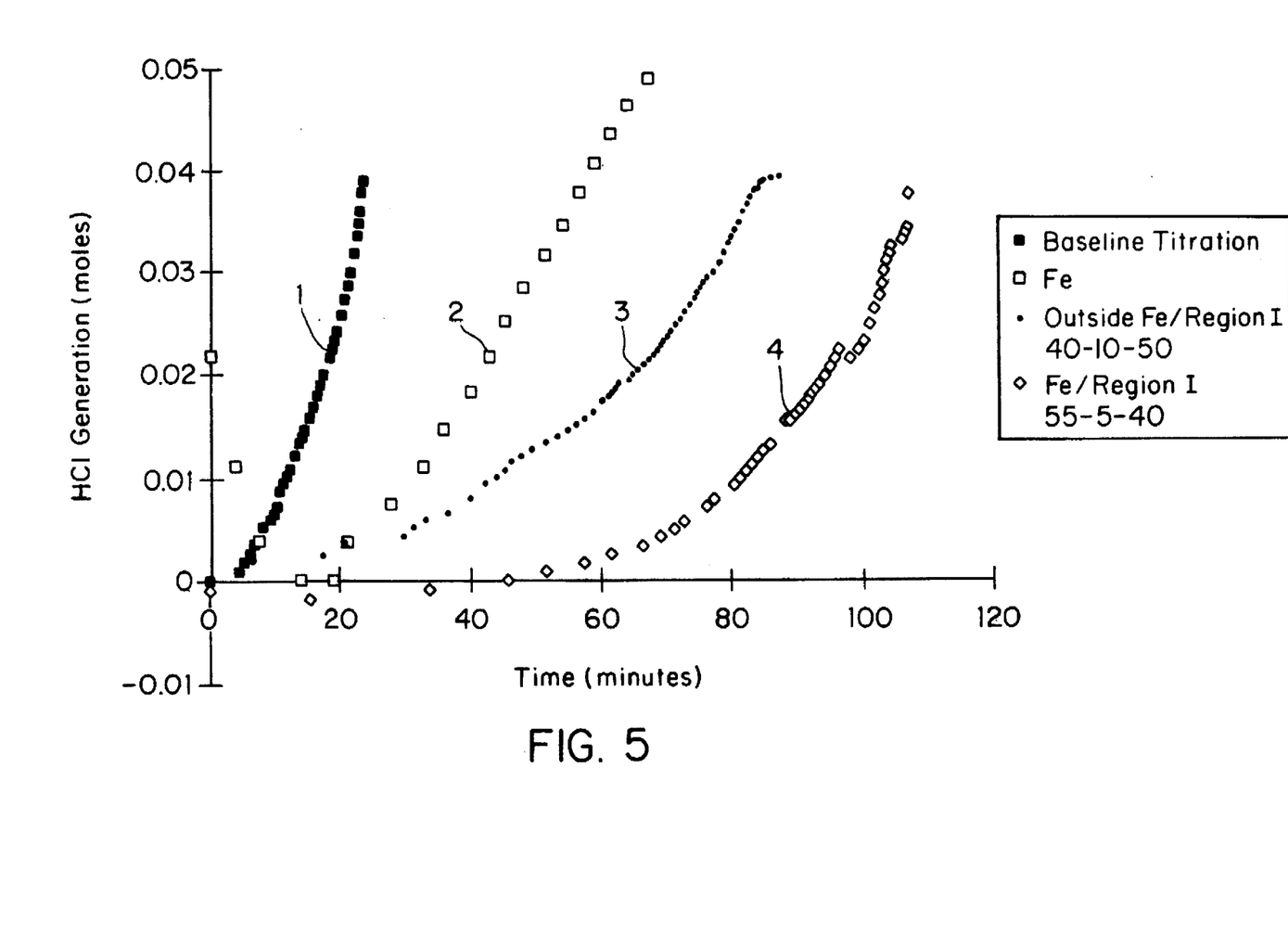
FIG. 5 is a plot of moles of hydrogen chloride released versus time from molten iron baths having various fluid vitreous layers wherein hydrogen chloride/argon gas mixtures were directed into the molten iron baths.

A bench scale induction furnace with a graphite suceptor was loaded with 1,000 grams of iron for a series of titration runs where hydrogen chloride gas was injected into the bottom of the molten iron bath. As shown in FIG. 5, a base line titration was conducted through the 1,000 grams of iron by injecting a 50% hydrogen chloride/50% argon, by volume, gas mixture at a rate of 0.2 liters per minute for twenty minutes into the iron granules at below its melting point to establish a base line for hydrogen chloride generated which is shown as line 1.

A second run was conducted at a temperature of 1,450° C. with only molten iron in the furnace. The argon/hydrogen chloride gas mixture was directed into the metal bath at 0.2 liters per minute. The run was conducted for about one hour. Similarly, third and fourth runs were conducted at a temperature of 1,450° C. The third run had 1,000 grams of iron and 250 grams of vitreous phase having a composition that had a concentration of 40-10-50 $CaO$—$Al_2O_3$—$SiO_2$, by mole percent, which was outside Region I, as shown in FIG. 2. The fourth run had 250 grams of ceramic having a concentration of 55-5-40 $CaO$—$Al_2O_3$—$SiO_2$, by mole percent, that was within Region I, as shown in FIG. 2. Lines 3 and 4 display the amount of hydrogen chloride gas generated over the period of the runs. Runs three and four had a duration of eighty and one hundred minutes, respectively.

The amount of hydrogen chloride off-gas and the rate that the off-gas exited from the reactor indicated the amount of capture of chlorine in a vitreous phase. The amount of hydrogen chloride gas coming off the vitreous phase was indirectly proportional to the amount of chlorine that was adsorbed in the vitreous phase. The vitreous composition of run 4 appeared to have captured more chlorine than the vitreous composition of run 3 because the argon/hydrogen chloride gas mixture was fed at the same rate during the two runs but exited more slowly during run 4 than run 3. Toward the end of both runs 3 and 4, the slopes of lines 3 and 4 approached that of line 2, indicating that most of the chloride was partitioned to the gas phase and the vitreous phase was approaching saturation.

EXAMPLE 4

Figure 6:
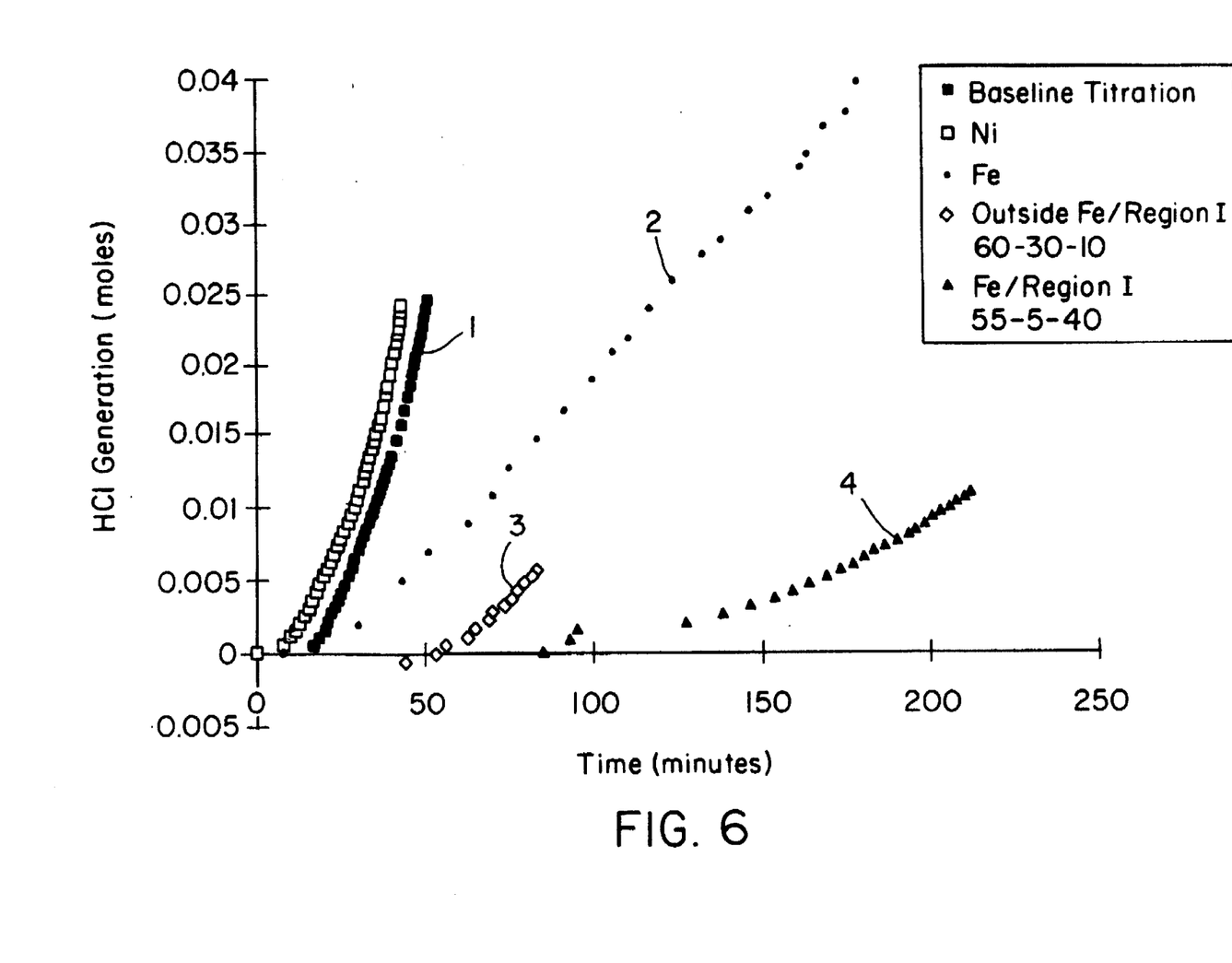
FIG. 6 is a second plot of moles of hydrogen chloride released versus time from molten iron baths having various fluid layers wherein hydrogen chloride/argon gas mixtures were directed into the molten iron baths.

A similar series of experimental runs was conducted as in Example 3. The results are disclosed in FIG. 6. In this series, 13.4% hydrogen chloride/86.6% argon gas mixture, by volume, was injected into the five-pound furnace at a rate of 0.2 liters per minute. The first run, line 1, was a base line run similar to the base line run in Example 3. The second run, line 2, was conducted at a temperature of 1,450° C. without a vitreous phase.

The third and fourth runs were conducted at 1,450° C. with 1,000 grams of iron and 250 grams of ceramic having a composition that had a concentration of 60-30-10 $CaO$—$Al_2O_3$—$SiO_2$, by mole percent, that was outside Region I, as shown in FIG. 2. The fourth run had 250 grams of ceramic having a concentration of 55-5-40 $CaO$—$Al_2O_3$—$SiO_2$, by mole percent, that was within Region I, as shown in FIG. 2. Lines 3 and 4 display the amount of off-gas hydrogen chloride generated. Runs 3 and 4 were about 80 and 200 minutes long, respectively. Run three was stopped after about 80 minutes because the vitreous phase solidified with the addition of chlorine in the presence of a high concentration of alumina. In contrast, the ceramic composition in run 4 appeared to have adsorbed a more substantial amount of chlorine with the vitreous phase remaining fluid during the run.

EXAMPLE 5

Another series of experimental runs were conducted similarly as in Examples 3 and 4. The results are disclosed in FIG. 7. In this series, two sets of gas mixtures were employed. The first mixture was a 50% argon/50% hydrogen chloride gas, by volume. The second mixture was 33% hydrogen chloride/33% carbon monoxide/33% hydrogen gas, by volume. This second mixture was intended to simulate the products of a chlorinated organic waste. The first gas mixture was fed at a rate of 0.2 liters per minute while the second mixture was fed at a rate of 0.3 liters per minute in order to maintain a stoichiometrically equal amount of chlorine atoms for each run.

Figure 7:
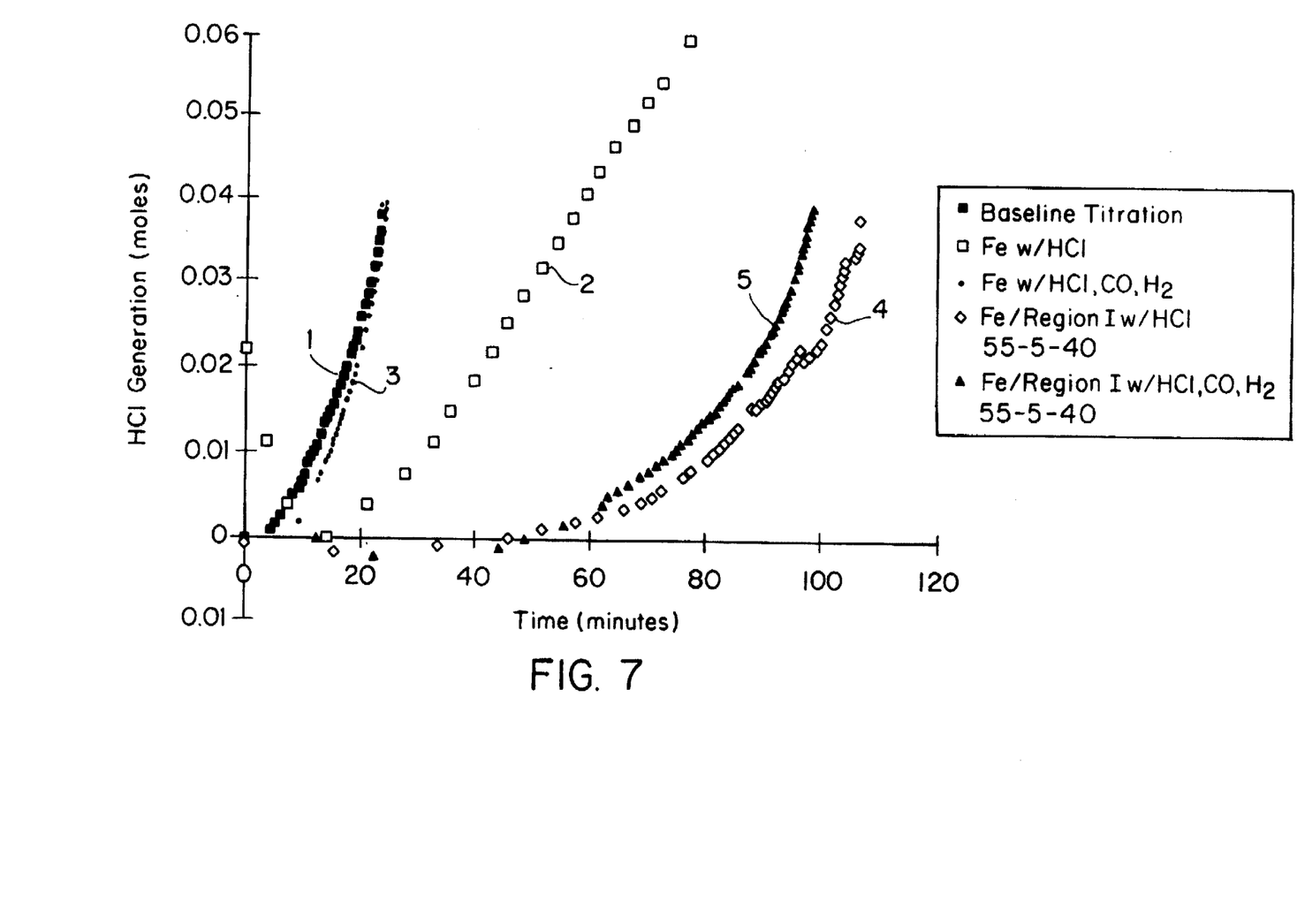
FIG. 7 is a third plot of moles of hydrogen chloride released versus time from molten iron baths having various fluid layers wherein a hydrogen chloride/argon gas mixture or a hydrogen chloride/carbon monoxide/hydrogen gas mixtures were directed into the molten iron baths.

A base line run, which was similar to the base line run in Example 3, was conducted through the iron granules and is identified as line 1. A second run, line 2, was conducted with molten iron with no vitreous phase while directing the hydrogen chloride/argon gas mixture through the metal and a third run, line 3, was conducted with the hydrogen chloride/carbon monoxide/hydrogen gas mixture. The fourth and fifth runs, lines 4 and 5, respectively, were similar to runs two and three except a vitreous phase having a composition that had a concentration of 55-5-40 $CaO$—$Al_2O_3$—$SiO_2$, by mole percent, that was within Region I as shown in FIG. 2. The vitreous phase in both the fourth and fifth runs were about the same for absorbing chlorine from a hydrogen chloride/argon gas mixture and a hydrogen chloride, carbon monoxide and hydrogen gas mixture.

EQUIVALENTS

Those skilled in the art will recognize, or be able to ascertain using no more than routine experimentation, many equivalents to specific embodiments of the invention described specifically herein. Such equivalents are intended to be encompassed in the scope of the following claims.

We claim:

1. A method for capture of chlorine dissociated from a chlorine-containing compound while maintaining a fluid vitreous phase, comprising the steps of:
    a) providing a molten bath having a molten metal phase and a fluid vitreous phase, said fluid vitreous phase including concentrations of calcium oxide, aluminum oxide, and silicon dioxide that cause the vitreous phase to remain fluid during exposure to chlorine dissociated from the chlorine-containing compound;
    b) directing the chlorine-containing compound into the molten metal phase to cause the chlorine to dissociate from said compound, whereby the chlorine migrates to the fluid vitreous phase and interacts with the calcium oxide in the fluid vitreous phase to form an inorganic chlorinated compound, while causing the vitreous phase to remain fluid during exposure to chlorine dissociated from the chlorine-containing compound, thereby capturing the chlorine dissociated from the chlorine-containing compound; and
    c) adjusting the concentrations of the calcium oxide, aluminum oxide and silicon dioxide to maintain the fluidity of the vitreous layer in the presence of captured chlorine.

2. The method of claim 1 wherein the concentration of calcium oxide is in the range of between about 35 and 70 percent, by weight.

3. The method of claim 2 wherein the concentration of silicon dioxide is in the range of between about 25 and 50 percent, by weight.

4. The method of claim 3 wherein the aluminum oxide in the vitreous phase has a concentration up to about 40 percent, by weight.

5. The method of claim 1 wherein the molten metal phase includes iron.

6. The method of claim 1 wherein the molten metal phase includes nickel.

7. The method of claim 1 wherein the molten bath has a temperature in the range of between about 1,400° and 1,700° C.

8. The method of claim 7 wherein the chlorine-containing compound is an organic chlorinated compound.

9. The method of claim 8 wherein the organic chlorinated compound is a chlorinated aromatic.

10. The method of claim 9 wherein the chlorinated aromatic is a polychlorinated biphenyl.

11. The method of claim 9 wherein the chlorinated aromatic is a dioxin.

12. The method of claim 8 wherein the organic chlorinated compound is a chlorinated alkane.

13. The method of claim 1 wherein the inorganic chlorinated compound is calcium chloride.

14. The method of claim 1 wherein the vitreous phase further includes at least one compound selected from the group consisting of magnesium oxide, strontium oxide, lithium oxide, sodium oxide and potassium oxide.

15. A method for capture of chlorine dissociated from a chlorine-containing compound, comprising the steps of:
   a) providing a molten bath having a molten metal phase and a fluid vitreous phase wherein said fluid vitreous phase includes concentrations of a calcium-containing composition, aluminum oxide and silicon dioxide to cause the vitreous phase to remain fluid during exposure to chlorine dissociated from the chlorine-containing compound;
   b) directing the chlorine-containing compound into the molten metal phase, whereby the chlorine dissociates from the chlorine-containing compound and migrates to the vitreous phase to interact with the vitreous phase and form an inorganic chlorinated compound or complex, while causing the vitreous phase to remain fluid during exposure to chlorine dissociated from the chlorine-containing compound, thereby capturing the chlorine of the chlorine-containing compound;
   c) removing a portion of the vitreous phase containing the inorganic chlorinated compound from the molten portion of the bath; and
   d) replacing the removed portion of the vitreous phase with a vitreous phase having a reduced content of said inorganic chlorinated compound.

16. The method of claim 15 wherein the calcium-containing composition includes calcium oxide and at least one compound selected from the group consisting of magnesium oxide, strontium oxide, lithium oxide, sodium oxide and potassium oxide.

17. A method for capture of chlorine dissociated from a chlorinated organic compound to prevent the formation of hydrogen chloride gas, comprising the steps of:
   a) providing a molten bath having a molten metal phase and a fluid vitreous phase, said fluid vitreous phase including concentrations of calcium oxide, aluminum oxide and silicon dioxide to cause the vitreous phase to remain fluid during exposure to chlorine dissociated from the chlorinated organic compound;
   b) directing the chlorinated organic compound into the molten metal phase to cause hydrogen and chlorine to dissociate from said compound, whereby the chlorine migrates to the fluid vitreous phase and interacts with the calcium oxide to form an inorganic chlorinated compound and the hydrogen migrates to a gas phase above the molten bath, while causing the vitreous phase to remain fluid during exposure to chlorine dissociated from the chlorinated organic compound, thereby capturing the chlorine dissociated from the chlorinated organic compound to prevent the formation of hydrogen chloride gas;
   c) removing a portion of the vitreous phase containing the inorganic chlorinated compound from the molten bath; and
   d) replacing the removed portion of the vitreous phase with a vitreous phase having a reduced content of said inorganic chlorinated compound, thereby continuing to capture the chlorine dissociated from the chlorinated organic compound to prevent the formation of hydrogen chloride gas, while maintaining the vitreous phase fluid.

18. A method for capture of chlorine dissociated from a chlorine-containing compound, comprising the steps of:
   a) providing a molten bath having a fluid vitreous phase, said fluid vitreous phase including a concentration of aluminum oxide of up to about five percent and concentrations of calcium oxide and silicon dioxide that cause the vitreous phase to remain fluid during exposure to chlorine dissociated from the chlorine-containing compound; and
   b) directing the chlorine-containing compound into the molten bath to cause the chlorine to dissociate from said compound whereby the chlorine migrates to the fluid vitreous phase and interacts with the calcium oxide in the fluid vitreous phase to form an inorganic chlorinated compound, while causing the vitreous phase to remain fluid during exposure to chlorine dissociated from the chlorine-containing compound, thereby capturing the chlorine dissociated from the chlorine-containing compound.

* * * * *